United States Patent Office 3,317,786
Patented May 2, 1967

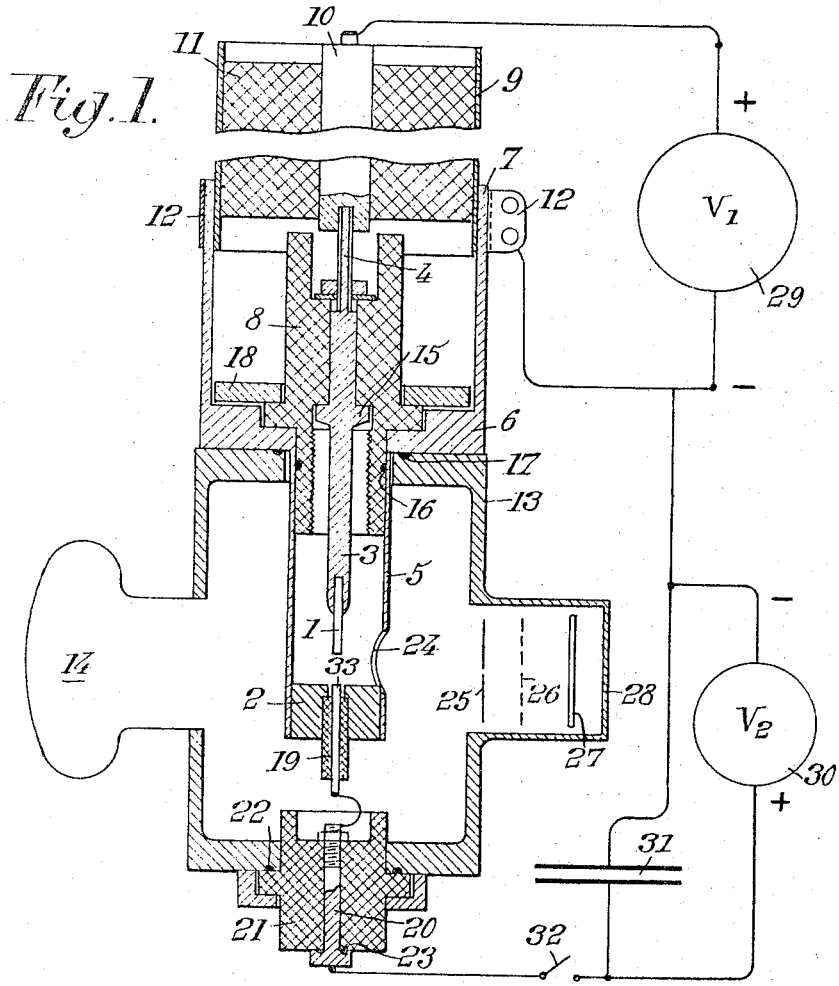
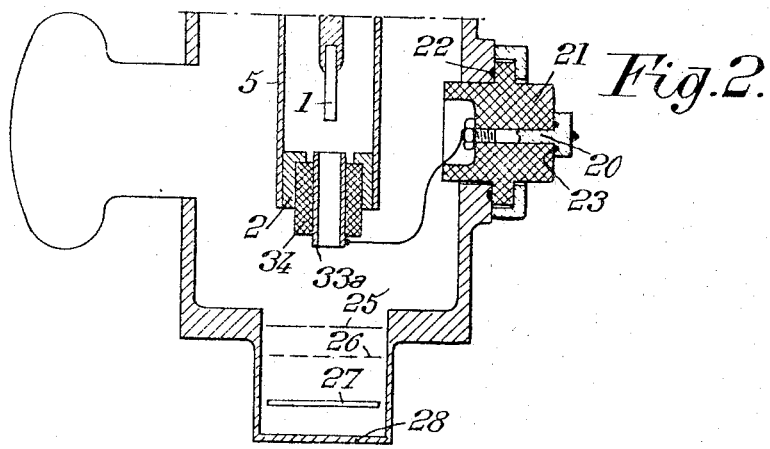

3,317,786
LIGHT SOURCE EMITTING A CONTINUOUS SPECTRUM IN THE EXTREME ULTRA-VIOLET RANGE
Jacques Romand, Bourg-la-Reine, Boris Vodar, Paris, and Germaine Balloffet, Charenton, France, assignors to Centre National de la Recherche Scientifique, Paris, France, a society of France
Filed Apr. 23, 1962, Ser. No. 189,447
Claims priority, application France, Apr. 27, 1961, 860,084
4 Claims. (Cl. 315—58)

It is known that one of the most interesting methods of investigating the properties and the structure of matter consists in studying the interactions between said matter and a radiation of an electromagnetic nature. These interactions determine in particular the magnitude of some coefficients characterizing the intensity of the beam reflected or transmitted by the matter relatively to the intensity of the incident beam.

It is also known that the range of the values of these coefficients as a function of the frequency of the radiation forming the incident beam constitutes the spectrum of the matter that is being studied (absorption or reflection spectrum). It is obvious, in these conditions, that if it is desired to obtain full information concerning the properties of the matter for every value of the frequency, it is necessary to utilize, to produce the radiation that forms the incident beam, a source supplying all the values of the frequency of the radiation (within certain limits, of course). The investigation device must comprise a "frequency analyzer" making it possible to measure said coefficients for every value of the frequency, or rather for every narrow frequency band existing within the range of the frequencies emitted by the source, this in order to obtain a continuous series of the informations which constitute the spectrum. Such analyzers are called spectroscopes, spectrographs, spectrometers, monochromators, filters. But they can give information only for the frequencies emitted by the source and, initially, it is necessary to have a source forming a continuous spectrum. If, within a given frequency band, the emission of the source is zero it is of course impossible to obtain any information within this band. Furthermore, the energy emitted by the source should be a relative monotonic function of the frequency, because too sudden variations of intensity complicate measurements.

Within the range of visible radiations, for instance, incandescent sources making use of thermal emission comply with these conditions.

But this is no longer the case for other frequency ranges such as the remote ultra-violet range and chiefly the extreme ultra-violet range, which is the region comprised between soft X-rays on the one hand, and ordinary ultra-violet rays on the other hand, the boundary between the extreme ultra-violet range and the soft X-rays being at about 40 A., whereas the boundary between the extreme ultra-violet range and the remote ultra-violet range is defined by the limit of transparency of air, the wavelength of which is about 2000 A. (1 A.=$10^{-8}$ cm.)

The object of the present invention is to supply a source, easy to use, emitting a continuous spectrum not only within the visible rays range but also in the ultra-violet range as far as the extreme ultra-violet, in particular within the whole of the band ranging from 100 to 2000 A.

It is known to use as light source sparks produced in a vacuum but up to now these sparks have permitted of obtaining only discontinuous spectra made of lines characteristic of the material of which the electrodes are made.

The chief object of this invention is to provide means giving off, in the sparks produced in a vacuum, an amount of energy per unit of volume which is extremely great, whereby it is possible to obtain a continuous spectrum on the anode or in the vicinity thereof.

Use is made for this purpose of an electric spark produced by the discharge of a capacitor between metallic electrodes located in a gastight chamber where the pressure has been reduced to a value of $10^4$ mm. of mercury or even less. In order to produce a current density sufficiently high to emit a continuous spectrum, electric circuit connecting the capacitor with the electrodes is such that the inductance to capacity ratio of this circuit has a value as low as possible, which increases the maximum current and reduces the duration of the sparks. Furthermore this circuit should produce a magnetic striction effect on the spark so as to reduce the cross section area thereof and, consequently to increase the instantaneous energy consumed in the spark, which permits of increasing the temperature and density thereof. This may be obtained by means of a coaxial structure closed upon itself and in which there is provided a gap, where the spark takes place. Finally, it was found that the continuous spectrum is more intensive if the metal of the electrode emitting the light rays, i.e., the anode, is made of atoms rich in electrons. This electrode is therefore advantageously made of a metal having a high atomic number, such as iron, platinum, uranium, this list having no limitative character.

The present invention is therefore concerned with a light source emitting a continuous spectrum within a range extending from visible light to the shortest wavelengths of the extreme ultra-violet range 100 A. or less), this source being constituted by a spark produced in a high vacuum between two electrodes, an anode and a cathode, located at a distance from each other ranging from one to several centimeters, by the discharge of a capacitor and started by an auxiliary spark also produced in a vacuum, the source being characterized by the fact that it comprises an electric circuit having a low inductance (less than 0.1 microhenry) and a low inductance to capacity ratio (lower than about 0.2 henry/farad) in order to give off in the spark a greater amount of energy per unit of volume, sufficiently great to permit of obtaining a continuous spectrum on the anode or in the vicinity thereof. This circuit advantageously comprises a coaxial element cut by a gap into two sections each of which connects one of the conducting surfaces of the capacitor with one of the electrode, and the anode being preferably made of a substance rich in electrons, such as uranium.

Preferred embodiments of the present invention will be hereinafter described with reference to the appended drawings given merely by way of example and in which:

FIG. 1 is an axial longitudinal section of a source made according to a first embodiment of my invention.

FIG. 2 is a part view showing a modification of the source of FIG. 1.

Referring first to FIG. 1, the spark is formed between the end of electrode 1 (anode) and that of electrode 2 (cathode). Electrode 1 is fixed through any suitable means to one end of an electrode carrier rod 3 the other end of which is threaded at 4. Electrode 2 is welded or screwed on the end of a tube 5 itself welded to a piece 6 the upper end 7 of which is of cylindrical shape. Electric insulation of electrode carrier 3 is obtained by means of an insulating piece 8. The unit 1–3–4 on the one hand and the unit 2–5–6–7 on the other hand constitute the two coaxial conductors or elements through which the spark is produced.

Between concentric parts 4 and 7 there is mounted a capacitor acting as a reserve of energy for the spark, which capacitor must have an inductance as low as possible. By way of example FIG. 1 diagrammatically shows a commercial capacitor which complies with this condition.

This capacitor comprises a cylindrical external conducting surface 9, a cylindrical internal conducting surface 10 and a dielectric 11 disposed between these two surfaces. Element 10, which is provided with a screw-threaded hole, is screwed on the threaded end 4 of electrode carrier 3. As for conducting element 9, it is tightly held in the cylindrical part 7 by means of a collar 12, the upper end of cylindrical part 7 being slit along several generatrices in order to give it the desired resiliency.

Tube 5 projects into the spark chamber 13, which is gastight and in communication with pumping means diagrammatically shown at 14 and capable of lowering the pressure to $10^{-4}$ mm. of mercury or less. Gastightness is obtained through suitable sealing means, for instance a collar 15 for piece 1-3-4, a toroidal shaped joint 16 for piece 8 and a toroidal shaped joint 17 for piece 6. Mechanical fixation of the whole is obtained by means of a ring 18 which presses piece 6 against piece 13, by means of screws (not shown) extending through piece 6.

It is known that, unless very high potentials are used, a pair of electrodes such as 1-2 does not permit of directly obtaining a spark in a vacuum. The spark is started by means of an auxiliary electrode 33 which permits of producing, with electrode 2, from which it is separated by insulating tube 19, a starting spark as described in the U.S. Patent 2,974,256 of J. L. Romand et al. of March 7, 1961. Electrode 33 is connected to a metallic rod 20 which projects to the outside of spark chamber 13, from which it is insulated by part 21 through which it passes, toroidal shaped joints 22-23 ensuring a gastight passage of rod 20 and piece 21.

A side orifice 24 is provided in the wall of tube 5 to permit observation of the radiations emitted at the end of anode 1. The observation means consist for instance of a vacuum spectrograph diagrammatically illustrated by a slot 25, a diffraction element 26 and a photographic plate 27, located in a gastight casing 28 in communication with spark chamber 13.

The feed current is as follows:

Conducting member 10 is connected to a positive terminal of the first generator 29 supplying a high direct voltage $V_1$ and the negative terminal of which is connected to the external envelope, for instance, through collar 12. On the other hand a second generator 30 capable of supplying a direct voltage $V_2$ charges a second capacitor 31 to a voltage $V_2$. The negative terminal of this capacitor 31 is connected with the earth, whereas its positive terminal is connected to rod 20 (and therefore with electrode 33) by means of a switch 32.

The operation of this device is as follows:

Generator 29 charges capacitor 9-10-11 to voltage $V_1$, whereas, switch 32 being open, generator 30 charges capacitor 31 to voltage $V_2$. When switch 32 is closed the auxiliary spark is produced between electrodes 2 and 33. The flow of charged particles (electrons, ions) which is thus produced causes the main spark to be formed between the end of anode 1 and cathode 2. A very bright light appears at the end of anode 1 and the images obtained on plates 27 show the formation of a continuous spectrum source at the end of anode 1. Experiments have shown that, as above stated, the continuous spectrum that is emitted is the more intensive as the metal of electrode 1 is richer in electrons. This electrode is therefore preferably made of a metal rich in electrons, such as iron, platinum, uranium, etc.

By way of non-limitative examples satisfactory results were obtained with the following values of the elements:

$V_1$=20,000 volts.
$V_2$=20,000 volts.
Capacity of capacitor 9-10-11: 0.5 microfarad ("Bosch" capacitor of the KO3 GH 357 type).
Capacity of capacitor 31: 0.25 microfarad.

Distance between the ends of electrodes 1 and 2: from 10 to 20 mm.
Inductance: 0.050 microhenry so that the inductance to capacity ratio is 0.1 henry/farad.
The anode was made of uranium, the cathode and the auxiliary electrode of steel and piece 19 of alumina.

The inductance of the starting spark circuit is relatively great and consequently the current is not very high in this circuit.

On the contrary, for the main spark circuit and with the above characteristics, measurements and calculations indicate a maximum current of 60,000 amperes and a mean power during the first half alternation of the current of 100,000 kw. approximately.

The continuous spectrum emitted in these conditions by a uranium electrode having a diameter of 2 mm. covers the whole extreme ultra-violet range, i.e. from 2,000 A. to 100 A., with a high intensity, the limit of 100 A. being not limitative but corresponding to the technical limit of the device for observing the spectrum used at the present time. It should be noted that the above described source indeed makes use of a circuit where the inductance to capacity ratio is low and facilitates striction of the discharge under the effect of the magnetic field produced by this discharge.

Of course, it would be possible, within the scope of the invention, to take all suitable steps to obtain the best possible efficiency and, in particular, to reduce the linear dimensions of the pieces, to make use, for the conducting pieces, of a metal which is a particularly good conductor, such as silver or copper or a deposit of such a metal on a different support, to choose diameters such that the inductance of conductors 3-4 on the one hand, and 5-6-7 on the other hand is as low as possible, and possibly to fill with an insulating oil of high dielectric rigidity the cavity between cylinder 7 and rod 4.

FIG. 2 shows a modification of the light source of FIG. 1.

According to this modification, the light that is emitted is observed in the direction of the axis of electrode 1 instead of perpendicularly to this axis. For this purpose the observation device 25-26-27 is disposed in line with said axis, the solid auxiliary electrode 33 being replaced by a tubular electrode 33a made of a hollow cylinder through which the light rays can pass. The insulating piece 19 is replaced by a piece 34. Finally, the unit 20-21-22-23 for the feed of the auxiliary electrode 33 is disposed laterally with respect thereto.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A light source for spectral analysis, capable of emitting a continuous spectrum ranging from visible light wavelengths to the shortest extreme ultra-violet wavelengths, this source comprising, in combination, means forming a high vacuum chamber, a main anode and a cathode located in said chamber at a distance from each other, an auxiliary anode mounted in said chamber in proximity of said cathode, electric means for producing a starting spark between said auxiliary anode and said cathode and an electric circuit, comprising a capacitor having its conducting surfaces connected with said main anode and said cathode respectively, for producing a spark between said two last mentioned electrodes, said electric circuit having an inductance lower than 0.1 microhenry and the inductance to capacity ratio of said circuit being lower than 0.2 henry/farad so as to give off in the spark an amount of energy per unit of volume sufficiently great to produce a continuous spectrum on the anode or in the vicinity thereof.

2. A light source for spectral analysis, capable of emitting a continuous spectrum ranging from visible light wavelengths to the shortest extreme ultra-violet wavelengths, this source comprising, in combination, means forming a high vacuum chamber, a main anode and a cathode located in said chamber at a distance from each other, an auxiliary anode mounted in said chamber in proximity of said cathode, electric means for producing a starting spark between said auxiliary anode and said cathode and an electric circuit for producing a spark between said two last mentioned electrodes, said electric circuit comprising a capacitor and two conducting elements coaxial with respect to each other and insulated from each other, said elements being mounted to connect said electrodes with the conducting surfaces of said capacitor, respectively, said electric circuit having an inductance lower than 0.1 microhenry and the inductance to capacity ratio of said circuit being lower than 0.2 henry/farad so as to give off in the spark an amount of energy per unit of volume sufficiently great to produce a continuous spectrum on the anode or in the vicinity thereof.

3. A light source according to claim 2 wherein the anode is made of a substance having a high atomic weight.

4. A light source according to claim 2 wherein the anode is made of uranium.

References Cited by the Examiner

UNITED STATES PATENTS

| | | | |
|---|---|---|---|
| 2,417,489 | 3/1947 | Hasler et al. | 315—237 |
| 2,937,299 | 5/1960 | Nolan | 315—241 |
| 2,974,256 | 3/1961 | Romand et al. | 315—237 |

JAMES D. KALLAM, *Primary Examiner.*

A. S. KATZ, *Assistant Examiner.*